(12) United States Patent
Sluder, III

(10) Patent No.: US 9,297,628 B2
(45) Date of Patent: Mar. 29, 2016

(54) AMMUNITION PRIMER POCKET GAUGE TOOL

(71) Applicant: John Lang Sluder, III, San Diego, CA (US)

(72) Inventor: John Lang Sluder, III, San Diego, CA (US)

( * ) Notice: Subject to any disclaimer, the term of this patent is extended or adjusted under 35 U.S.C. 154(b) by 80 days.

(21) Appl. No.: 14/502,503

(22) Filed: Sep. 30, 2014

(65) Prior Publication Data
US 2015/0107126 A1 Apr. 23, 2015

Related U.S. Application Data

(60) Provisional application No. 61/893,477, filed on Oct. 21, 2013.

(51) Int. Cl.
G01B 3/34 (2006.01)
G01B 3/28 (2006.01)
G01B 3/26 (2006.01)

(52) U.S. Cl.
CPC ... *G01B 3/28* (2013.01); *G01B 3/26* (2013.01)

(58) Field of Classification Search
CPC .............. G01B 3/26; G01B 3/28; G01B 3/34; G01B 3/50; G01B 5/08; G01B 5/18
USPC ............. 33/506, 542, 543, 550, 555.1, 555.2, 33/836
See application file for complete search history.

(56) References Cited

U.S. PATENT DOCUMENTS

| | | | |
|---|---|---|---|
| 3,769,712 A * | 11/1973 | Hong ........................ | G01B 5/08 33/813 |
| 4,077,319 A | 3/1978 | Edmisten | |
| 4,090,305 A * | 5/1978 | Cassidy ..................... | F41G 1/54 33/391 |
| 4,092,924 A | 6/1978 | Edmisten | |
| 4,222,305 A | 9/1980 | Lee | |
| 4,608,762 A | 9/1986 | Varner | |
| 4,773,164 A * | 9/1988 | Taylor ........................ | F41G 1/54 33/286 |
| 4,918,825 A * | 4/1990 | Lesh ......................... | G01B 5/14 33/506 |
| 5,025,706 A | 6/1991 | Markle | |
| 5,253,427 A * | 10/1993 | Bartlett ..................... | G01B 3/30 33/501.08 |
| 5,301,436 A * | 4/1994 | Johnston .................. | F42B 35/02 33/506 |
| 5,365,669 A * | 11/1994 | Rustick ................ | G01B 5/0023 33/DIG. 21 |
| 5,396,708 A * | 3/1995 | Whitley ................... | F41G 3/323 279/2.02 |
| 5,471,757 A * | 12/1995 | McDonald ............... | G01B 3/30 33/199 R |
| 6,151,788 A * | 11/2000 | Cox ....................... | G01B 11/27 33/286 |

(Continued)

*Primary Examiner* — G. Bradley Bennett
(74) *Attorney, Agent, or Firm* — Daniel Baudwin; Global Intellectual Property Agency, LLC

(57) ABSTRACT

A primer pocket gauge tool for handloading ammunition is provided, in which the size of the pocket can be verified prior to installation of a specific primer thereinto. The device comprises an elongated member having a first end and a second end, the first end adapted to verify that the pocket meets the minimum dimensions for a specific primer, and the second end adapted to verify the pocket is below the maximum diameter for the same primer. The first end has a diameter and a depth marker to measure the diameter of the primer pocket and its depth, while the second end has a diameter equal to the maximum allowable primer pocket diameter for the given primer. The user verifies the pocket tolerances for a specific primer prior to installation. Also contemplated are individual maximum and minimum gauge members, and incorporation into a swage tool.

15 Claims, 3 Drawing Sheets

(56) References Cited

U.S. PATENT DOCUMENTS

| | | | | |
|---|---|---|---|---|
| 6,338,201 B1* | 1/2002 | Och | ............ | G01B 7/14 33/501.11 |
| 2,387,645 A1 | 12/2004 | Waarts | | |
| 2002/0178598 A1* | 12/2002 | Berger | ............ | G01B 5/24 33/506 |
| 2004/0200084 A1* | 10/2004 | Wang | ............ | G01B 3/50 33/501.45 |
| 2006/0248739 A1* | 11/2006 | Cauley | ............ | F41A 31/00 33/506 |
| 2009/0320310 A1* | 12/2009 | Pelotte | ............ | G01B 3/28 33/836 |
| 2010/0005676 A1* | 1/2010 | Fujikawa | ............ | G01B 5/12 33/542 |
| 2013/0219728 A1* | 8/2013 | Hartman | ............ | G01B 3/205 33/506 |
| 2014/0196300 A1* | 7/2014 | Williamson, IV | ............ | G01B 3/28 33/701 |

* cited by examiner

AMMUNITION PRIMER POCKET GAUGE TOOL

CROSS REFERENCE TO RELATED APPLICATION

This application claims the benefit of U.S. Provisional Application No. 61/893,477 filed on Oct. 21, 2013, entitled "Ammunition Primer Pocket Gauge." The above identified patent application is herein incorporated by reference in its entirety to provide continuity of disclosure.

BACKGROUND OF THE INVENTION

1. Field of the Invention

The present invention relates to measuring tools and to handloading ammunition. More specifically, the present invention relates to a handheld gauge tool that allows a user handloading a firearm bullet to measure the tolerances of a primer pocket without the use of a caliper.

Handloading ammunition has several benefits for the outdoorsman and enthusiast. First, handloading greatly reduces the cost per bullet, once the necessary equipment has been purchased and its investment has been recouped. Secondly, handloading can be used to make more precisely loaded bullets with closer tolerances, which can improve accuracy of the bullet exiting the firearm. Thirdly, the spent brass after a round at the shooting range can be reused and recycled into new bullets, whereby waste is reduced and material usage is reduced. These benefits make handloading a popular activity for some, and particularly to those who enjoy shooting, hunting, and for those who are required to maintain their shooting skills for a profession.

Firearm bullet s generally comprise a bullet projectile, which is supported within a brass case filled with a propellant. The bullet is supported along one end of the case and a primer is positioned at the opposite end. The primer is struck and used to ignite the propellant, whereby the pressure created ejects the bullet from the barrel of the firearm and ejects the empty casing from the ejection port. This configuration is well known in the art of bullets and firearms, and serves as a reliable manner to fire a bullet projectile from the barrel of a firearm.

The present invention specifically pertains to positioning the primer within the primer pocket of the brass casing, and furthermore to swaging tools adapted to cold work the casing while handloading. More specifically, the present invention relates to ensuring proper dimensions are maintained in the primer pocket while handloading, whereby that the primer can be properly seated with the correct tolerances. Primers are typically inserted cautiously but with sufficient force so as to fully seat the primer into a primer pocket. If the pocket is smaller in diameter than the primer, the primer can potentially be crushed and explode during the loading process. If the pocket is shallower than the height of the primer, the primer will stick out of the pocket when positioned therein. This can result in a "slam" fire in which the round lights off as soon as it's chambered. This can also cause the firearm to explode. The potential therefore exists to injure or kill the user and surrounding bystanders if the handloading of the bullet is conducted properly and to correct tolerances.

The present invention comprises a measurement gauge that is sized such that the tool can quickly be deployed and used to determine the appropriate dimensions of a primer pocket without reading indicia. The tool comprises one or more elongated members, each member having a first and a second measuring end. The first end has a specific diameter and is used to measure the minimum diameter of the primer pocket. The second end has a second diameter that is used to measure the maximum diameter of the primer pocket. Along the first end is a depth marker that is used to show whether the depth of the primer pocket is within tolerance when the first end is completely disposed within the primer pocket interior. Primer pockets have specific sizes and allowable tolerances for specific style firearms (i.e. specific primer sizes), therefore a gauge tool is contemplated for each style and size range. Overall, the tool provides a quick dimension measuring device for a user handloading bullets to ensure the proper primer pocket dimensions are within allowable tolerances for the given primer size.

2. Description of the Prior Art

Devices have been disclosed in the prior art that relate to ammunition primer pockets. These include devices that have been patented and published in patent application publications. These devices generally relate to primer loading devices and devices generally for gauging an article of ammunition. The following is a list of devices deemed most relevant to the present disclosure, which are herein described for the purposes of highlighting and differentiating the unique aspects of the present invention, and further highlighting the drawbacks existing in the prior art.

U.S. Pat. No. 5,025,706 to Markle discloses a controlled depth primer seating tool, which comprises a tool the supports a shell casing and controllably inserts a primer into the primer pocket thereof. A measurement assembly measures the depth of the tool probe seats the primer within the primer pocket and provides a slight pre-load compression of the anvil head. The Markle device, while a useful tool for inserting and seating a primer into the primer pocket while accommodating tolerances, is not adept at measuring the primer pocket and ensuring the pocket is sized adequately to receive the primer without causing damage or improper seating thereof.

Similar to Markle is U.S. Pat. No. 4,222,305 to Lee, which discloses a tool for inserting primers in to primer pockets using a spring biased lever mechanism. While being capable of loading primers into respective primer pockets, the Lee device fails to provide a means to measure the primer pocket for adequate clearance prior to inserting the primer thereinto. The purpose and the function of the Lee and Markle device diverge from that of the present invention, wherein the Lee and Markle devices are representative of insertion tools in the art and the present invention relates to a gauge tool prior to inserting a primer.

Gauge tools in the art include U.S. Pat. No. 2,387,645 to Cook, which discloses a gauging machine having an elongated table, a bullet support member, a reciprocating gauging rod, and a reciprocating head member. The gauging rod is pressed into the bullet and through the table, wherein an abutment member maintains alignment between the gauging rod and the bullet. The Cook device is one that is suitable for use on a workbench, wherein a large assembly is supported and a reciprocating mechanism is deployed as the tool holds the bullet. The present invention contemplates a simpler gauging mechanism, wherein one or more gauge rods are used to measure the tolerances of a primer pocket and quickly determine whether the pocket is too wide, too narrow, too shallow or too deep.

Finally, U.S. Pat. No. 4,608,762 to Varner discloses bullet seating gauge that ensures the bullet is properly seated within the bullet casing such that its maximum girth area engages the rifling of the firearm barrel. An elongated, threaded shaft extends through the base of a bullet casing to move the bullet along the opposing end. The threaded shaft extends through the primer pocket bore and through the interior of the casing.

Conversely, the present invention relates to a measurement gage after the primer pocket has been positioned within the primer pocket bore. The gauge of the present invention measures the dimensions of the primer pocket itself prior to insertion of the primer thereinto.

The present invention comprises one or more primer pocket gauge tools that are elongated gauge rods having a first end and a second end, wherein the first end measures the minimum diameter of the primer pocket and the second end measures the maximum diameter of the primer pocket. The primer pockets are designed to accommodate a specifically sized primer therein. Proper fitment of the primer therein is of paramount importance, therefore proper dimensions of the pocket must be ensured prior to loading the primer into the pocket. Along with maximum and minimum diameter verification, the gauge tool of the present invention also measures depth of the primer pocket to ensure the depth is within a given allowable tolerance for the specific primer being loaded. The present invention offers a quick reference tool that does not require measurement or an elaborate measuring apparatus that would otherwise require an investment that must be recouped by the handloading user.

Overall, the present invention substantially diverges in design elements from the prior art, and consequently it is clear that there is a need in the art for an improvement to existing primer pocket gauge tool devices. In this regard the instant invention substantially fulfills these needs.

SUMMARY OF THE INVENTION

In view of the foregoing disadvantages inherent in the known types of gauge tools now present in the prior art, the present invention provides a new gauge tool device that can be utilized for providing convenience for the user when handloading firearm bullets and checking the size of the primer pocket prior to loading a primer thereinto.

It is therefore an object of the present invention to provide a new and improved primer pocket gauge tool device that has all of the advantages of the prior art and none of the disadvantages.

It is another object of the present invention to provide a primer pocket gauge tool that is used to verify the dimensions of a primer pocket of a known size, and therefore ensure proper tolerances are provided for the primer to be inserted therein.

Another object of the present invention is to provide a primer pocket gauge tool that is a simple hand tool that can ensure the primer pocket diameter and depth are within specifications.

Yet another object of the present invention is to provide a primer pocket gauge tool that ensures the primer is not pressed into an inadequate sized primer pocket, either too large or too small, thereby preventing potential mishaps related to the ammunition as a result of improper primer seating or preload.

Another object of the present invention is to provide a primer pocket gauge tool that comprises an elongated rod, whereby both ends of the rod measure the diameter specifications and one end is used to verify depth specifications of a primer pocket.

Another object of the present invention is to provide a primer pocket gauge tool that may be incorporated into a handloading swage tool.

Another object of the present invention is to provide a primer pocket gauge tool may be readily fabricated from materials that permit relative economy and are commensurate with durability.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
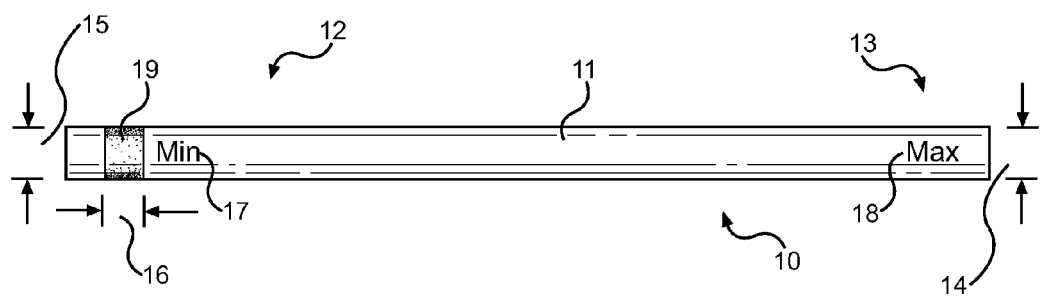
FIG. 1 shows a side view of the primer pocket gauge tool of the present invention.

Reference is made herein to the attached drawings. Like reference numerals are used throughout the drawings to depict like or similar elements of the primer pocket gauge tool of the present invention. For the purposes of presenting a brief and clear description of the present invention, the preferred embodiment will be discussed as used for verifying the dimensions of a primer pocket prior to handloading a primer thereinto. The figures are intended for representative purposes only and should not be considered to be limiting in any respect.

Referring now to FIG. 1, there is shown a side view of the primer pocket gauge tool 10 of the present invention, in which the minimum and maximum dimensions of a primer pocket can be measured using a single tool. The device comprises an elongated member 11 having a first end 12 and a second end 13. The first end 12 is adapted to verify that the primer pocket meets the minimum allowable dimensions and has a depth within the allowable range. The second end 13 is used to verify the primer pocket is not above its maximum allowable diameter. The first end 12 is therefore adapted to be inserted into a primer pocket of known size, wherein successful insertion illustrates the primer pocket diameter is sufficiently sized above the minimum allowable size. A depth gauge 19 is provided adjacent to the first end 12 in which the depth of the primer pocket is verified. Finally, the second end 13 is then positioned against the primer pocket to verify the second end 13 does not achieve successful insertion thereinto. The second end 13 is sized such that any primer pocket above its diameter is out of the allowable range for the specific primer to be inserted.

Proper dimensioning of the primer pocket is critical to successfully and safely seating a primer of known size into a pocket adapted to receive the primer. Improper sizing can create faulty ammunition, cause misfires or unwanted activation, and expose the handloading installer and firearm user to danger. Primers are designed for specific munition sizes, wherein the primer has a specific size and shape. The primer is received within a primer pocket that is sized to receive the specific primer with a given clearance. The primer pocket is generally a cylindrical opening within the base of the ammunition, wherein the cylindrical opening has a specific depth. The pocket provides a diameter and depth such that the primer is seated without being preloaded and such that the primer does not extend rearward from the base of the ammunition such that it is partially exposed. The size of the primer pocket depth and diameter must be within a given size range to accommodate a primer of known size, whereby larger or smaller sizes are out of range and thus not suitable for receiving the primer.

Figure 2:
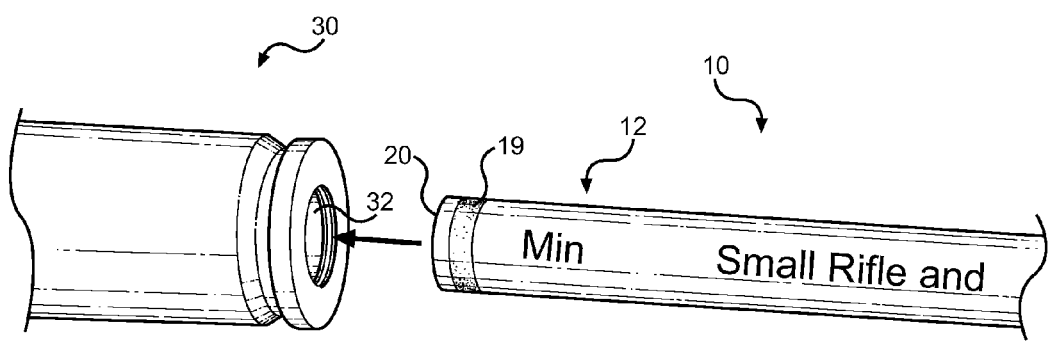
FIG. 2 shows a view of the primer pocket gauge tool being inserted into an open primer pocket to verify its dimensions.

Referring now to FIGS. 1 and 2, the user verifies that the dimensions of the primer pocket 32 are within allowable ranges by inserting the ends of the device into the primer pocket 32. The user first verifies that the primer pocket 32 is not too wide for the given primer. The second end 13 thereof, noted by the "MAX" indicia 18, is placed against the primer pocket 32. If the second end 13 successfully inserts thereinto, the pocket 32 is above its allowable diameter and thus is not acceptable for receiving the primer. The diameter 14 of the second end 13 is sized such that it equals or is slightly greater than the maximum allowable diameter of the primer pocket 32, therefore the ability to insert thereinto illustrates a pocket 32 that is too large for the given primer.

If the user cannot insert the second end 13 into the pocket 32, the user next verifies whether the primer pocket 32 is greater than the minimum diameter and whether its depth is within an acceptable range. The diameter 15 of the first end 12 is sized such that it equals or is just greater than the minimum allowable diameter for the given primer pocket 32. Successful insertion of the first end 12 ensures that the primer pocket 32 does not have too small of a diameter to accommodate the given primer. The first end 12, similar to the second end 13, is denoted with "MIN" indicia 17 and further includes a depth gauge strip 19 adjacent thereto. The strip 19 is used to measure the allowable depth of the primer pocket 32 once the first end 12 has been inserted thereinto.

The strip 19 is used as a depth gauge, whereby the strip 19 extends around the circumference of the first end 12 and includes a width 16 that is equal to the allowable depth range of the primer pocket. The end of the strip 19 adjacent to the distal end 20 of the first end 12 is the minimum allowable primer pocket depth, while the outer end of the strip is the maximum allowable primer pocket depth. The measurement is taken after the distal end 20 is pressed against the interior wall of the primer pocket, whereby visualization of the pocket outer extent can be verified as falling within the strip extents or being too shallow or deep. In this way, the primer pocket 32 of the ammunition round 30 can be checked for the major dimensions prior to installation of the primer thereinto.

Figure 3:
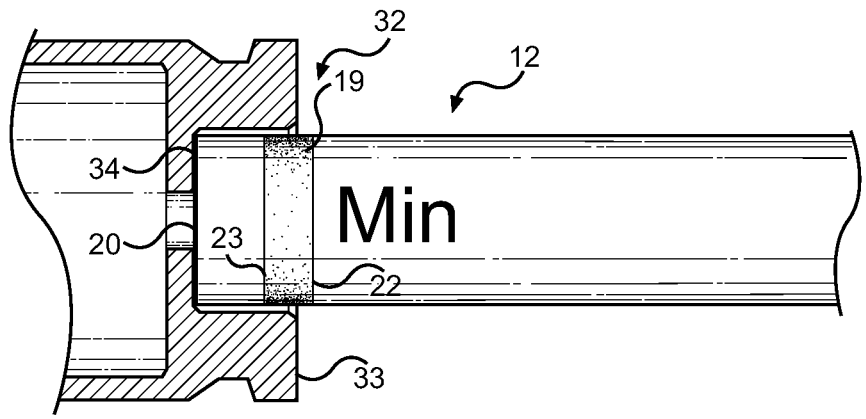
FIG. 3 shows a cross section view of the primer pocket gauge tool inserted into a primer pocket.

Referring now to FIG. 3, there is shown a cross sectional view of the primer pocket and the gauge tool of the present invention, illustrating the method in which the interior dimensions of the pocket 32 are verified. As illustrated, the first end 12 of the gauge (e.g. the "MIN" end) is inserted into the pocket 32 interior. The distal end 20 of the device is pressed against the interior wall 34 of the primer pocket 32. This procedure is generally conducted after the second end of the tool has been inserted, whereby the diameter of the pocket is verified as below the maximum allowable. The first end 12 verifies that the pocket diameter is not too small. Insertion of the tool thereinto verifies the pocket diameter is not too small and will accommodate a primer specific for the given bullet.

Once fully inserted and the minimum diameter is verified as within allowable tolerance, the depth gauge strip 19 is employed to verify the depth of the pocket 32 is within an allowable range. The strip 19 is parallel to the distal end 20 of the tool and extends around the perimeter thereof. The strip 19 is visible to the user and has an outer extent 23, an inner extent 22, and a width that is defined as a specific color identifiable from the body of the tool. To verify the depth of the pocket 32, the outer surface 33 of the bullet must fall within the outer 23 and inner 22 extents of the strip 19. If the end of the tool is visible between the pocket outer surface 33 and the strip 19, the pocket depth is too shallow. Conversely, if the strip outer extent 22 is positioned within the pocket interior, the depth is too great. In this way, the first end 12 of the device measures both minimum diameter and depth of the primer pocket 32.

The primer pocket size for a given bullet is based on the primer size, which is a known quantity. The allowable pocket size for a given primer is stipulated by the munitions industry through Sporting Arms and Ammunition Manufacturers' Institute, Inc. (SAAMI). SAAMI creates and publishes industry standards for safety, interchangeability, reliability and quality, and furthermore coordinates technical data for munitions. It is contemplated that the dimensions of the present invention will be set to the maximum and minimum allowable dimensions set forth by SAAMI for a type of firearm ammunition. Notably, the diameter of first and second end and the distance of the depth measuring strip and its width will correspond to SAAMI guidelines. The following table outlines the contemplated dimensions of the primer pocket to be measured by the gauge tool of the present invention, based on SAAMI standards. The gauge tool will be sized to measure the minimum and maximum of the primer pocket depth and diameter. The primer pocket sized is broken down by munition type.

TABLE I

Primer Pocket Specifications (inches)

| Primer Pocket | Min. Diameter | Max. Diameter | Min. Depth | Max. Depth |
| --- | --- | --- | --- | --- |
| Small Rife/Pistol | 0.1730 | 0.1745 | 0.1170 | 0.1230 |
| Large Pistol | 0.2085 | 0.2100 | 0.1170 | 0.1230 |
| Large Rifle | 0.2085 | 0.2100 | 0.1250 | 0.1320 |

Figure 4:
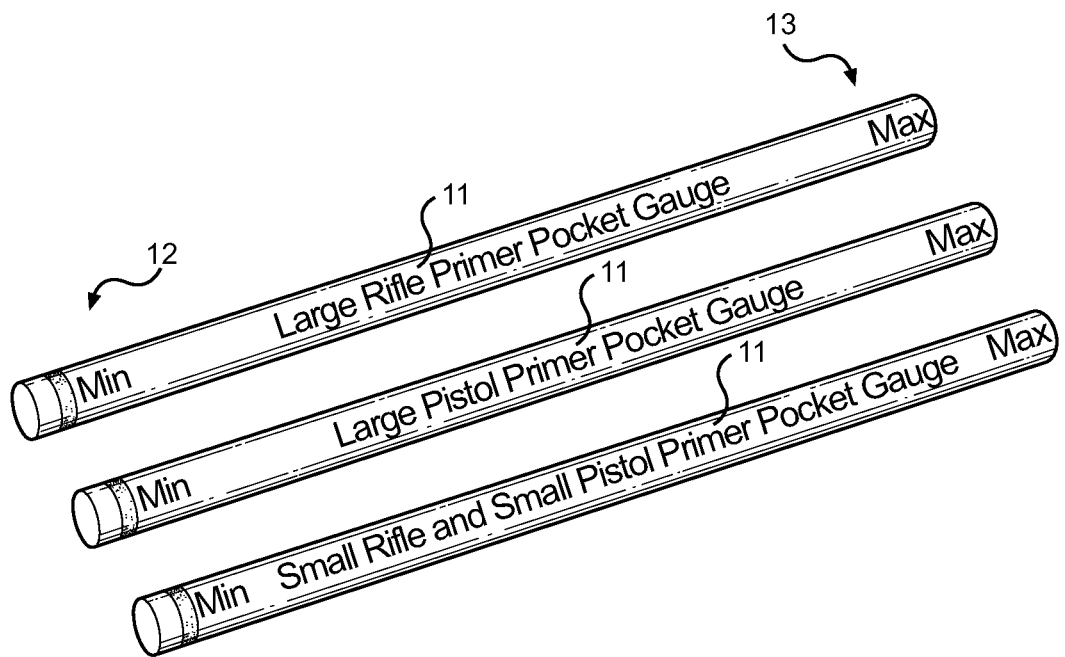
FIG. 4 shows a view of several primer pocket gauge tools, each designed to verify a specific primer pocket size.
Figure 5:
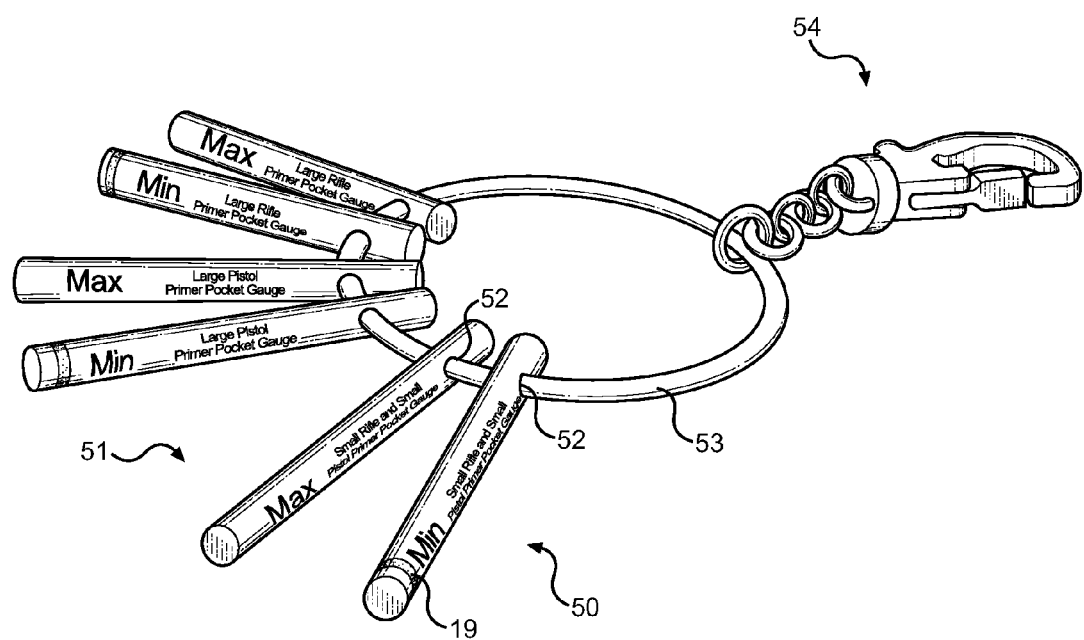
FIG. 5 shows an embodiment of the present invention in which a plurality of primer pocket gauge tools are disposed on a ring and only one end thereof is used as a gauge.

Referring now to FIGS. 4 and 5, there are shown embodiments of the gauge tool of the present invention, wherein the tool measuring capabilities may be disposed on a single member for each ammunition type (FIG. 4), or the MIN/MAX measurement functions may be separated into two separate members (FIG. 5). In the former embodiment and as shown in FIG. 4, the tool comprises an elongated member with a first end 12 and second end 13, each end having a measuring capability and the first end 12 combining depth and diameter measurements. Different primer pocket sizes, based on munition sizes, are measured using separate members 11, each member being fully capable of measuring min/max diameter and depth.

For the latter embodiment and as shown in FIG. 5, the min/max measuring functions are spread into individual members, wherein a min gauge 50 and a max gauge 51 are deployed for a single primer pocket. The proximal, non-measuring ends thereof can be retained by a ring 53 securing through apertures 52 in each tool. Each primer pocket size has a pair of measuring tools 50, 51, wherein a plurality thereof can be retained on the ring 53 and secured to the user by way of a spring clip 54 if so desired.

In either embodiment, the device comprises an elongated rod with specific diameters on the measuring end (or ends), and a strip for verifying primer pocket depth. The tool is inserted into the primer pocket of a firearm, wherein if the device fits into the pocket, the primer pocket is of minimum diameter. If the device does not fit into the pocket, the proper pocket is out of specification and the bullet casing should be discarded. The device is configured to verify the specifications of a primer pocket of ammunition for rifles and pistols, to verify a swage tool is properly set up by running a casing and checking the casing with the tool, and to prevent a primer from becoming jammed in the primer pocket or ill-fitted thereinto.

A user that handloads once-fired brass can use the present gauge tool to verify a swage tool is set up properly and to verify dimensions prior to primer insertion. In assisting a swage operation, users set up a swage tool and run a casing therethrough. The user checks the casing using the gauge tool such that he or she will then know the swage tool is set up and function accurately. After this, the user will then be able to seat a primer properly into the primer pocket. Failure to use the gauge tool or otherwise verify the pocket dimensions can cause a primer to be jammed into the primer pocket, potentially causing an explosion during the seating process. The present invention is submitted as a tool that quickly enables a user to verify the diameter and depth of the primer pocket. In this way, the present invention provides a useful assistant for the handloading user.

It is submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A primer pocket gauge tool, comprising:
    an elongated member having a first end, a second end, and a length;
    said first end having a diameter and a distal end;
    said second end having a diameter;
    said first end adapted to verify a primer pocket minimum diameter;
    said second end adapted to verify a primer pocket maximum diameter;
    said diameter of said first end being equal to or slightly greater than a primer pocket minimum diameter;
    said diameter of said second end being equal to or slightly greater than a primer pocket maximum diameter;
    a depth gauge strip adjacent to said distal end of said first end;
    said depth gauge strip having an outer extent, an inner extent, and a width;
    said depth gauge strip adapted to verify a primer pocket depth is within an acceptable range;
    said outer extent being offset from said distal end a distance equal to a primer pocket minimum depth;
    said inner extent being offset from said distal end a distance equal to a primer pocket maximum depth.

2. The primer pocket gauge tool for claim 1, wherein said depth gauge strip extending circumferentially about said elongated member and in parallel to said distal end.

3. The primer pocket gauge tool for claim 1, wherein said depth gauge strip is a colored marking about said elongated member.

4. The primer pocket gauge tool for claim 1, wherein said diameter of said first end, diameter of said second end, and said width and offset of said depth gauge strip are all representative of dimensions of a primer pocket for a specific style of ammunition.

5. The primer pocket gauge tool for claim 1, wherein said first end further comprises a "MIN" measurement indicia.

6. The primer pocket gauge tool for claim 1, wherein said second end further comprises a "MAX" measurement indicia.

7. A primer pocket gauge tool, comprising:
    an elongated member having a first end, a second end, and a length;
    said first end having a diameter and a distal end;
    said first end adapted to verify a primer pocket minimum diameter;
    said diameter of said first end being equal to or slightly greater than a primer pocket minimum diameter;
    a depth gauge strip adjacent to said distal end of said first end;
    said depth gauge strip having an outer extent, an inner extent, and a width;
    said depth gauge strip adapted to verify a primer pocket depth is within an acceptable range;
    said outer extent being offset from said distal end a distance equal to a primer pocket minimum depth;
    said inner extent being offset from said distal end a distance equal to a primer pocket maximum depth.

8. The primer pocket gauge tool for claim 7, wherein said second end further comprises an aperture adapted to receive a ring therethrough.

9. The primer pocket gauge tool for claim 7, wherein said depth gauge strip extending circumferentially about said elongated member and in parallel to said distal end.

10. The primer pocket gauge tool for claim 7, wherein said depth gauge strip is a colored marking about said elongated member.

11. The primer pocket gauge tool for claim 7, wherein said diameter of said first end, diameter of said second end, and said width and offset of said depth gauge strip are all representative of dimensions of a primer pocket for a specific style of ammunition.

12. The primer pocket gauge tool for claim 7, wherein said first end further comprises a "MIN" measurement indicia.

13. A primer pocket gauge tool, comprising:
    an elongated member having a first end, a second end, and a length;
    said first end having a diameter and a distal end;
    said first end adapted to verify a primer pocket maximum diameter;
    said diameter of said first end being equal to or slightly greater than a primer pocket maximum diameter.

14. The primer pocket gauge tool for claim 13, wherein said first end further comprises a "MAX" measurement indicia.

15. The primer pocket gauge tool for claim 13, wherein said second end further comprises an aperture adapted to receive a ring therethrough.

* * * * *